United States Patent

Descamps et al.

[11] Patent Number: 5,126,083
[45] Date of Patent: Jun. 30, 1992

[54] SILICONE FOAMS OF IMPROVED FIRE RESISTANCE

[75] Inventors: Pierre Descamps, Seneffe, Belgium; Andreas T. F. Wolf, Midland, Mich.

[73] Assignee: Dow Corning S.A., Seneffe, Belgium

[21] Appl. No.: 819,155

[22] Filed: Jan. 9, 1992

[30] Foreign Application Priority Data

Jan. 12, 1991 [GB] United Kingdom ............... 9100707

[51] Int. Cl.$^5$ .................................................. C08J 9/34
[52] U.S. Cl. ...................... 264/45.5; 521/91; 521/154; 521/51
[58] Field of Search ................... 521/91, 154, 51; 264/45.4

[56] References Cited

U.S. PATENT DOCUMENTS 4,613,630  9/1986  Bauman et al. ............... 521/134
4,760,098  7/1988  Miutel .............................. 521/82

Primary Examiner—Morton Foelak
Attorney, Agent, or Firm—Roger H. Borrousch

[57] ABSTRACT

The specification describes and claims a method of making silicone foam compositions comprising the steps of introducing into a moulding cavity a quantity of foamable silicone compositions which is curable at room, or slightly elevated, temperature and bring about curing in the cavity to produce a cured silicone foam. The moulding cavity is closed prior to foaming thereby restricting expansion of the foam. The volume of the closed moulding cavity is a minimum 10% less than that which would be occupied by the composition if it foamed and cured at room temperature without restriction. Lower density foams formed by the above procedure may be converted into rigid elastomeric low density materials by a heat or microwave post cure. For a given composition and foam density the fire resistance of a foam produced by a method according to the invention is greater than a foam which is allowed to foam freely.

16 Claims, No Drawings

SILICONE FOAMS OF IMPROVED FIRE RESISTANCE

This invention is concerned with preparation of silicone foams of improved fire resistance.

Liquid, foam forming, curable silicone compositions are available which flow and foam readily at room or slightly elevated temperature to provide a cured foam product. It has been proposed to employ foamable silicone based room temperature curable compositions for various purposes, including applications where fire resistance is desirable. For example, U.S. Pat. Specification No. 4,760,098 is directed to a composition of selected formulation which is curable and foamable at room temperature for preparation of flexible silicone foams of good fire resistance and low density which have good mechanical and physical properties. The compositions may be cured in a mould; the moulds exemplified are generally open but there is mention of gelling the composition in a closed mould and opening the mould and placing it in an oven at 60° to 70° C. for 15 minutes to cure the foam.

Whilst it is desirable to provide fire resistant foams of lower density than previously employed, it is generally accepted that the fire resistance of foams of lower density is lower than the fire resistance of foams of higher density. We have now found, surprisingly, that the fire resistance of a cured silicone foam may be enhanced by restricting the expansion of the foam as it cures.

The invention provides in one of its aspects a method of making a cured silicone foam comprising the steps of introducing to a moulding cavity a quantity of a silicone composition which is curable at room or slightly elevated temperature to provide a foam and bringing about curing of the composition in the moulding cavity to form the cured silicone foam characterised in that the moulding cavity is closed during foaming of the composition whereby to restrict expansion of the foam and in that the volume of the closed moulding cavity is at least 10% less than the volume which would be occupied by the foam produced by permitting that quantity of the composition to foam and cure at room temperature without restriction.

In a method according to the invention the selected silicone composition, which is curable at room or slightly elevated temperature to provide a foam, is introduced to a moulding cavity. The moulding cavity may be of any desired design and may be for the production of any article. If desired one or more surfaces of the moulding cavity may be provided by a surface of an element, for example a building element, to which the cured foam is intended to adhere with or without the use of a surface primer. The moulding cavity may be provided by a mould comprising for example a base and side walls and a moveable top which provides closure means for closing the cavity. Alternatively, the moulding cavity may be defined by two preformed elements for example panels of building board, stone, metal or glass spaced apart to provide a moulding cavity which is closed at its periphery by spacer elements, one or more of which provides closure means for the mould. We prefer that the moulding cavity is one designed for the production of building components, for example, separation wall panels, exterior cladding elements, ceiling panels, silicone foam blocks or automotive body panels. Prior to introduction to the moulding cavity the composition is mixed, care being taken that the cure does not progress significantly before the composition is introduced to the moulding cavity. The composition may be mixed and introduced to the moulding cavity by any suitable means for example by injection or pouring. Before or after introduction of the composition to the moulding cavity, the moulding cavity is closed for example by closure means which may take any suitable form, and the foaming of the composition occurs in the closed moulding cavity. It is important in respect of the fire retardant properties of the foam that the volume of the closed moulding cavity is less than the volume which would be occupied by the foam produced by permitting the same quantity of the composition as used in the method according to the invention to foam and cure at room temperature without restriction. When the moulding cavity was reduced in volume by up to 8% we observed that there was no increase in the fire resistance of the cured foam. For a reduction of 10% in the volume of the moulding cavity a significant increase in the fire resistance of the cured foam was observed. Further reductions in the moulding cavity volume resulted in cured foams of increased fire resistance. However, there was an attendant rise in the densities of the cured foams. Curing may be brought about by maintaining the mould at a temperature of the order of 18° to 35° C., although curing may be accelerated by heating the composition. After the moulding has formed and cured the closure means may be removed from the moulding cavity and the foam or laminate (comprising foam bonded to one or more panels) may be released.

Foams of any density, for example in the range 40 to 700 Kg/m$^3$, may be prepared using many silicone compositions by a method according to the invention in which the composition is foamed and cured at room or slightly elevated temperature. Many of the lower density foams formed are relatively soft and spongy products. However, by use of the most preferred compositions referred to hereinafter one may employ a method according to the invention to prepare somewhat rigidly elastomeric low density silicone foam mouldings having high flexural strength, low compression set, and good self adhesion to panel substrates, leading to good resistance to compression, tension or deflection. Surprisingly we have also found that the cured mouldings may be converted to a more crosslinked form by subjecting the mouldings to heat in a post cure, after completion of the foaming process. This is especially useful with respect to the relatively soft and spongy lower density mouldings which thus may be converted to somewhat rigidly elastomeric low density silicone foam mouldings having some at least of the mentioned properties, particularly good rigidity. The post cure may be achieved, for example, by maintaining the foam at a temperature of from about 80° C. to about 120° C. for from 1 to 24 hours in an oven. Mouldings which are difficult to heat sufficiently in an oven, for example due to their size or due to the heat sensitive nature of panels to which the foam has been caused to adhere, may alternatively be subjected to a post cure by microwave heating; this method is effective for those foams which contain sufficient ingredients which demonstrate a heating effect when subjected to microwaves. These elastomeric properties of the foam cannot be achieved by aging the room temperature cured foam at room temperature. Foam mouldings having these more elastomeric properties are useful, for example in producing somewhat rigid low density silicone foam mouldings having lips, grooves or the like which serve a mechanical purpose, for example building panels or blocks with interlocking recesses and tabs suitable for assembly as a continuous wall of interlocking panels or blocks with or without the additional use of adhesive or sealant.

The foamable silicone composition used in a method according to the invention may be any of those which are commercially available which comprise an organosilicon polymer including siloxane units having a silicon-bonded hydrogen atom, a hydroxy bearing material, for example an organosilicon polymer including siloxane units providing silicon-bonded hydroxyl groups and a catalyst, for example a tin compound or more preferably a noble metal compound or complex. They may (and where post cure by microwave heating is intended, should) also comprise finely divided filler. These compositions cure according to the scheme OH-+ ≡SiH —> ≡Si—O—+H$_2$. A polymeric material reactive with the silicon-bonded hydrogen atoms is included in the composition for example an organosilicon polymer having silicon-bonded hydroxyl and/or unsaturated e.g. vinyl groups so that a network of interconnected polysiloxane chains is produced and the hydrogen evolved as a gas serves to form cells within the developing network. Preferred foam forming, curable organosilicone polymer compositions comprise a polydiorganosiloxane having silicon-bonded unsaturated e.g. vinyl groups available for reaction with polysiloxanes having silicon-bonded hydrogen atoms. The addition reaction which occurs is appropriate to yield chain extended or crosslinked elastomeric silicone products but does not generate volatile materials for causing foaming in the curing composition. The foaming may be achieved by chemical reaction of the silicon-bonded hydrogen atoms with silicon-bonded hydroxyl groups and/or water or an aliphatic alcohol as more fully described for example in U.S. Pat. No. 4,613,630, or by inclusion in the composition of a volatile blowing agent. The polysiloxanes and other ingredients and the proportions thereof are selected so that the network is sufficiently developed and cured to produce a resilient foam of desired cellular structure within a short period of time of the order of a few minutes or less.

Suitable polysiloxanes including siloxane units having a silicon-bonded hydrogen atom include polysiloxanes having units according to the general formula $$R_pHSiO_{\frac{(3-p)}{2}}$$

in which each R represents a monovalent hydrocarbon group containing 1 to 20 carbon atoms, for example a lower alkyl or phenyl group e.g. a methyl group, and p is 1 or 2. The polysiloxanes may also comprise units $$R_nSiO_{\frac{(4-n)}{2}} \quad (i)$$

in which R is as referred to above and n is 1, 2 or 3. Preferably, the polysiloxane has from 0.3% to 2.5% by weight of silicon-bonded hydrogen atoms. We prefer that each R represents a methyl group. Preferably, terminal groups of the polysiloxane have the formula R$_3$SiO$_{\frac{1}{2}}$ where each R represents a methyl group. Suitable polysiloxanes include those comprising MeHSiO units with or without the presence of Me$_2$SiO (where Me represents a methyl group) units and having viscosities of the order of from about 1 to about 1000 mm$^2$/s more preferably from about 5 to about 50 mm$^2$/s.

Suitable polysiloxanes having silicon-bonded unsaturated e.g. vinyl groups available for reaction with polydiorganosiloxanes having silicon-bonded hydrogen atoms include polysiloxanes having siloxane units according to the general formula $$R_mR'SiO_{\frac{(3-m)}{2}}$$

in which each R represents a monovalent hydrocarbon group having up to 20 carbon atoms, for example a lower alkyl or phenyl group e.g. a methyl radical, m is 1 or 2 and R' represents an aliphatically unsaturated group for example cyclohexenyl or a group CH=CHR" linked to the silicon atom for example via a divalent aliphatic chain wherein R" represents a hydrogen atom or an alkyl group for example vinyl, allyl or hexenyl. These polysiloxanes also comprise units (i) in which R and n are as referred to above. These materials are reactive with the silicon-bonded hydrogen atoms in presence of a noble metal catalyst by a hydrosilylation reaction and thus contribute to the polysiloxane matrix. Preferably these polysiloxanes have from 0.0002% to 3% by weight of aliphatically unsaturated groups and n is such that they have a viscosity of the order of about 10mm$^2$/s to about 500,000 mm$^2$/s. Preferred compositions employ a polysiloxane having siloxane units according to the general formula $$R_mR'SiO_{\frac{(3-m)}{2}}$$

in which R' represents a group CH=CH$_2$ linked to the silicon atom via a divalent aliphatic chain and having a viscosity in the range 100 mm$^2$/s to 2000 mm$^2$/s.

Suitable organosilicon polymers including siloxane units providing a silicon-bonded hydroxyl group include polydiorganosiloxanes having at least two siloxane units of the formula $$R_aQ_bSiO_{\frac{(4-(a+b))}{2}}$$

in which a has a value of 0, 1 or 2, b has a value of 1 or 2 and the sum of a+b is not greater than 3, Q represents a hydroxyl group for example silanol terminated polydioganosiloxanes according to the general formula HO((R$_2$)SiO)$_s$H in which each R represents a methyl group and s has a value from about 10 to about 1200. Suitable materials have viscosities of the order of about 10 mm$^2$/s to about 500,000 mm$^2$/s. Preferred compositions which provide the more elastomeric foams employ polydiorganosiloxanes according to the general formula HO((R$_2$)SiO)$_s$H as aforesaid which have viscosities of the order of about 2,500 mm$^2$/s to about 20,500 mm$^2$/s. The density of the silicone foam can be significantly reduced without degrading its structural strength by including a short-chain silanol terminated polydiorganosiloxane in the formulation. Preferred compositions employ polydiorganosiloxanes according to the general formula HO(R$_2$SiO)$_s$H as aforesaid in which s has a value from about 2 to about 10. Preferred materials have viscosities of the order of about 5mm$^2$/s to about 100 mm$^2$/s. Polydiorganosiloxanes having at least two siloxane units of the formula

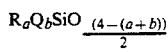

in which Q is a hydroxyl bearing alkylene or oxyalkylene chain may also be used. The chain may be attached to the silicon atom in any convenient way but is preferably linked to the silicon atom by a carbon atom. Suitable hydroxyl bearing chains include those containing up to 50 chain atoms. Suitable alkylene chains are those having 1 to 15, more preferably 4 to 10 chain carbon atoms. Suitable oxyalkylene chains include those of the formula $(C_dH_{2d}O)_eH$ in which d has the value 2, 3 or 4 and e has a value in the range 1 to 15 more preferably 1 to 10, i.e. having from 1 to 15, more preferably 1 to 10 oxyalkylene groups. The oxyalkylene groups may be for example oxyethylene, oxypropylene or oxybutylene or mixtures thereof, the most preferred being the oxyethylene group. This polydiorganosiloxane also comprises siloxane units (i) as aforesaid. Other materials which may be included as crosslinking agents include materials having three or more functional e.g. hydroxy groups per molecule.

Compositions for use in the invention preferably include one or more alcohols. These materials influence the structure of foams formed by use of the composition and yield cured foams of low density. The alcohol is selected with a view to contributing not only generation of hydrogen gas but also with a view to achieving desired resilience of the foam. Suitable alcohols include the primary aliphatic and araliphatic alcohols for example the lower aliphatic mono functional alcohols having up to 8 carbon atoms, e.g. ethanol, propanol, butanol and benzyl alcohol. Foams of lowest density are formed by use of the aliphatic alcohols having from 2 to 12 chain carbon atoms. Preferred compositions employ n-propanol.

Compositions suitable for use in the invention preferably employ a foam stabiliser or surfactant. Suitable foam stabilising materials include fluorinated silicones, for example a polyorganosiloxane comprising

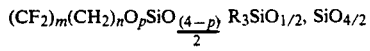

units and siliconbonded hydroxyl groups wherein each R represents a monovalent hydrocarbon group containing from 1 to 20 carbon atoms, m is an integer having an average value of from 1 to 20, n has the value 1 or 2, p has the value 1, 2 or 3. The polysiloxane may also include from 0 to 10 percent, based on the weight of said polyorganosiloxane, of $GSiO_{3/2}$ units wherein G represents the residue obtained by removing the hydrogen atom from a hydroxyl group of a linear organic polymer selected from the group consisting of homopolymers of ethylenically unsaturated alcohols, copolymers of these alcohols with ethylenically unsaturated hydrocarbons, polyethers and polyoxyalkylene glycols, wherein said organic polymer contains an average of at least one terminal hydroxyl group per molecule. These materials may be prepared by treatment of hexamethyldisiloxane coated polysilicates with the alcohol $F(CF_2)_8CH_2CH_2OH$, and are more fully described and claimed in European Patent Specification 179 598. They serve to stabilise the structure of the foam during its curing.

Suitable noble metal catalysts include rhodium and platinum containing materials. Platinum catalysts may take any of the known forms, ranging from platinum as deposited on carriers such as silica gel or powdered charcoal to platinic chloride, salts of platinum and chloroplatinic acids. A preferred form of platinum is chloroplatinic acid either as the commonly obtainable hexahydrate or the anhydrous form, on account of its easy dispersibility in organosilicon systems and its non-effect on colour of the mixture. Platinum complexes may also be used e.g. those prepared from chloroplatinic acid hexahydrate and divinyl tetramethyldisiloxane. Compositions according to the invention foam and cure very rapidly when the component parts have been mixed together. If it is desired to prolong the cure time, for example if it is desired to mix the composition and then transfer it to the site where it is intended to foam and cure, one may include in the composition one of the known platinum catalyst inhibitors such as a polymethylvinylsiloxane cyclic compound or an acetylenic alcohol e.g. methyl butynol. Larger proportions of catalyst may be used when a faster cure is desired.

If desired other adjuvants may be included in a composition for use in the invention, for example fillers, colorants, coloured indicators and extenders. Fillers which may be used include, for example silica, glass beads or glass microspheres all of which may be treated to render them hydrophobic, calcium carbonates and carbon black.

Compositions for use in the invention may be formulated to cure within a short period of time. In order to achieve this it is important that the ratio of silicon-bonded hydrogen atoms to all carbon-bonded or siliconbonded hydroxyl groups, together with other reactive hydroxyl, unsaturated and other groups present in the composition is appropriate. This ratio may be in the range 2.0:1 to 35:1 and is preferably in the range 2.5:1 to 10:1. The ratio of silicon-bonded hydrogen atoms to carbon-bonded hydroxyl groups and silicon-bonded hydroxyl groups is suitably in the range 2.0:1 to 40:1 more preferably 2.5:1 to 10:1. The ratio of aliphatically unsaturated groups to silicon-bonded hydrogen atoms is preferably in the range 1:20 to 1:150 more preferably in the range 1:20 to 1:90. The ratio of aliphatically unsaturated groups to carbonbonded hydroxyl groups and silicon-bonded hydroxyl groups may be in the range 1:2 to 1:60, more preferably 1:5 to 1:18. We have found that compositions in which the ingredients are present in the preferred ratios can be formulated to cure within 20 to 40 seconds of mixing of the composition at room temperature (i.e. of the order of 18° C. to 20° C.) and humidity (i.e. about 30% to 90% relative humidity) to provide cured foams of a density between about 40kg/m³ and 600kg/m³ or less when foamed freely or cured foams of a density between about 50 and 700kg/m³ when foamed by a method according to the invention. The foams formed according to the invention are fine pored foams of uniform cell size. They are hydrophobic and generally comprise from about 20% to about 80% closed cells and correspondingly about 80% to about 20% open cells, the more closed cell foams being produced when increased proportions of the foam stabiliser are present.

Compositions suitable for use in the invention foam and cure when mixed at room temperature and humidity. Accordingly the reactive components are stored separated until required for use. In order to enable simplicity and ease of mixing the components at the application site, it is preferred to store the compositions in two-part form in which each of the parts is of substantially the same viscosity so that the first and second parts may be mixed together in a ratio of 1:1 by volume or 1:1 by weight as desired.

A method according to the present invention may be used to produce foams of various densities and combinations of properties by adjustment of the foam formulation. For any given foam density, the fire resistance of foams produced according to the invention is greater than the fire resistance of foams formed by permitting the foam to expand and cure freely without constraint on its foamed volume. The evaluation of fire resistance as meant in this specification involves exposing the foam to a flame; prior art foams tend to exhibit large cracks in the exposed foam surface very quickly upon exposure to the flame and these permit heat to penetrate quickly through the mass of the foam, whereas foams made according to the invention are more resistant to penetration of heat. We believe this is due to a more homogenous foam structure of foams made according to the invention coupled with a small average cell size.

In order that the invention may become more clear there now follows a description of example compositions according to the invention. All parts are by weight unless otherwise specified.

In the Examples the following materials were used:

The polysiloxane I having silicon-bonded hydrogen atoms was a trimethylsilyl end-blocked polymethylhydrogensiloxane having a viscosity of about 30 mm$^2$/s and 1.5 mole % hydrogen.

The polysiloxane II having silicon-bonded hydrogen atoms was a trimethylsilyl end-blocked polysiloxane having methylhydrogensiloxane and dimethylsiloxane units having a viscosity of about 5 mm$^2$/s and 0.76 mole % hydrogen.

The polysiloxane III having silicon-bonded hydroxyl groups was a dimethylhydroxysilyl endblocked polydimethylsiloxane having a viscosity of about 13,500 mm$^2$/s and a hydroxyl content of about 0.066 mole %.

The polysiloxane IV having silicon-bonded hydroxyl groups was a dimethylhydroxylsilyl endblocked polydimethylsiloxane having a viscosity of about 42 mm$^2$/s and a hydroxyl content of 4 mole %.

The polydiorganosiloxane V having silicon-bonded unsaturated groups was a dimethylvinylsilyl endblocked polydimethylsiloxane having a viscosity of about 450 mm$^2$/s and 0.45 mole % vinyl groups.

The foam stabiliser was prepared by treatment of hexamethyldisiloxane coated polysilicates with the alcohol $F(CF_2)_8CH_2CH_2OH$, as more fully described in European Patent Specification 179 598.

Cyclic polymethylvinylsiloxane compounds were used to adjust the speed of cure. N-propanol was used as a blowing agent for the low density foams. Chloroplatinic acid, complexed with vinyldisiloxane, was used as the catalyst. Ground quartz of 5 micron particle size was used as filler 1. For the purpose of better microwave (RF) radiation absorbance ultra-fine carbon black with high dielectric loss was added as Filler 2.

Fire resistance of sample foam plates was evaluated by positioning the plate at an angle of 45° over a blue flame of a blow torch and spaced 10cm from the orifice of the torch with the tip of the blue flame just touching the plate. The time required for the flame to penetrate through the plate was measured. The values in seconds are recorded in the Tables as "fire resistance". As can be seen from the results, for any given foam density, the fire resistance of foams produced according to the invention is greater than the fire resistance of foams formed by permitting the foam to expand and cure freely without constraint on its foamed volume.

EXAMPLE 1

Example compositions were prepared which comprised two parts A and B and contained ingredients in the amounts shown in Tables I(a) and I(b).

The value given in Table II for Molar Ratio 1 is the ratio of silicon-bonded hydrogen atoms of the polysiloxane to all carbon bonded hydroxyl groups together with other reactive hydroxyl, unsaturated and other groups present in the composition. The value given for Ratio 2 is the ratio of silicon-bonded hydrogen atoms to silicon-bonded and carbon-bonded hydroxyl groups. The value given for Ratio 3 is the ratio of aliphatically unsaturated groups to silicon-bonded hydrogen atoms and the value given for Ratio 4 is the ratio of aliphatically unsaturated groups to carbon-bonded hydroxyl groups and silicon-bonded hydroxyl groups.

A mould was prepared comprising a base, four side walls normal to the base and a lid to close the mould and so define a closed moulding cavity capable of producing foam plates 270mm thick. The inner dimensions of the closed moulding cavity were 20×20×2.7 cm corresponding to a volume of the closed moulding cavity 1080 cm$^3$. Compositions were prepared by mixing equal volumes of the Parts A1, A2, A3 and B1 or A4 and B2. Each of these example compositions was mixed to form a homogenous fluid and poured into the moulding cavity within 30 seconds of mixing. In a first group of experiments the composition was poured into the mould but the moulding cavity was not closed by the lid. It was found that the compositions each cured in 120 to 600 seconds or less to provide a fine pored foam of density as shown in Table II. The quantities of the compositions formed by mixing equal volumes of the Parts A and B required to produce a cured foam which just filled the mould are shown in Table II as "Quantity Free Foam". In a second group of experiments, quantities as shown in Table II as "Quantity Constrained Foam" obtained by mixing equal volumes of the Parts A and B (principally approximately 10% more than the quantities required to produce a cured foam which just filled the mould) were mixed in the same way and introduced to the mould and the mould closed by the lid and clamped closed. Each composition was allowed to foam and cure in the mould cavity at room temperature. The density of the foams was found to be as shown in Table II. These foam samples were removed from the moulding cavity and aged at room temperature for 24 hours. The foams formed in both groups of experiments were demoulded and post cured by heating in an oven maintained at 100° C. for a further 24 hours. The samples from the second group of experiments were found to have a much more regular and homogenous cell structure than those formed in the first group of experiments.

EXAMPLE 2

Compositions were processed in a similar manner to that employed in Example 1 but the sample mouldings produced measured 10×10×2 cm. The post cure was carried out during microwave radiation. The samples were placed between two plates of a capacitor in such a way that a distance of 3 mm between the plates and the foam sample was maintained. The samples were then post cured with a radio wave signal of 35 MHz at 3-4 kV potential for 10 seconds. The formulations employed are shown in Table III and the resultant properties are recorded in Table IV.

TABLE I(a)

| | Formulations | | |
|---|---|---|---|
| | A1 | B1 | A2 |
| Polysiloxane I or II having silicon-bonded hydrogen | | | |
| I | — | 23.8 | — |
| II | — | 1.7 | — |
| Polysiloxane III or IV having silicon-bonded hydroxyl groups carbon-bonded hydroxyl groups | | | |
| III | 39.9 | 49.3 | 40.2 |
| IV | — | 9.4 | — |
| N-propanol | 2.0 | — | 1.7 |
| Polysiloxane V having unsaturated groups | | | |
| V | 30.6 | 1.7 | 30.8 |
| Methylvinyl cyclics | — | 0.1 | — |
| Foam stabiliser | 6.5 | — | 6.0 |
| Catalyst | 0.5 | — | 0.5 |
| Filler 1 | 15.3 | 13.6 | 15.5 |
| Pigment | | | |
| (a) | 5.2 | — | 5.3 |
| (b) | — | 0.4 | — |

TABLE I(b)

| | Formulations | | |
|---|---|---|---|
| | A3 | A4 | B2 |
| Polysiloxane I or II having silicon-bonded hydrogen | | | |
| I | — | — | 8.6 |
| II | — | — | 2.1 |
| Polysiloxane III or IV having silicon-bonded hydroxyl groups carbon-bonded hydroxyl groups | | | |
| III | 41.4 | 43.6 | 59.5 |
| IV | — | — | 11.3 |
| N-propanol | 1.0 | — | — |
| Polysiloxane V having unsaturated groups | | | |
| V | 31.7 | 33.4 | 2.0 |
| Methylvinyl cyclics | — | — | 0.1 |
| Foam stabiliser | 4.0 | — | — |
| Catalyst | 0.5 | 0.5 | — |
| Filler 1 | 16.0 | 16.8 | 16.4 |
| Pigment | | | |
| (a) | 5.4 | 5.7 | — |
| (b) | | | |

TABLE II

| | Composition formed by mixing Parts | | | |
|---|---|---|---|---|
| Property | A1 + B1 (D) | A2 + B1 (C) | A3 + B1 (B) | A4 + B2 (A) |
| Molar Ratio | | | | |
| 1 | 2.9:1 | 7.1:1 | 6.3:1 | 6.0:1 |
| 2 | 3.5:1 | 8.4:1 | 7.3:1 | 6.9:1 |
| 3 | 1:24.6 | 1:66.3 | 1:68.1 | 1:68.7 |
| 4 | 1:7.1 | 1:7.9 | 1:9.4 | 1:10.1 |
| Curing time (sec) | 420 | 175 | 150 | 140 |
| Quantity (ml) | | | | |
| Free Foam | 150 | 210 | 260 | 310 |
| Constrained Foam | 165 | 230 | 290 | 345 |
| Density (Kg/m³) | | | | |
| Free Foam | 150 | 210 | 260 | 310 |
| Constrained Foam | 165 | 230 | 290 | 345 |
| Elastomer properties (Young's modulus of Compression) | | | | |
| Free Foam | | | | |
| Before post cure | 0.013 | 0.040 | 0.066 | 0.128 |
| After post cure | 0.062 | 0.080 | 0.155 | 0.178 |
| Constrained Foam | | | | |
| Before Post-Cure | 0.043 | 0.051 | 0.190 | 0.290 |
| After Post-Cure | 0.057 | 0.105 | 0.390 | 0.315 |
| Fire Resistance | | | | |
| Free Foam | | | | |
| Before Post-Cure | 300 | 420 | 540 | 1300 |
| After Post-Cure | 450 | 500 | 550 | 1800 |
| Constrained Foam | | | | |
| Before Post-Cure | 420 | 540 | 720 | 3600 |
| After Post-Cure | 800 | 800 | 1200 | 3550 |

TABLE III

| | Formulations | | |
|---|---|---|---|
| | A5 | B3 | A6 |
| Polysiloxane I or II having silicon-bonded hydrogen | | | |
| I | — | 26.7 | — |
| II | — | 1.4 | — |
| Polysiloxane III or IV having silicon-bonded hydroxyl groups | | | |
| III | 41.4 | 39.9 | 40.1 |
| IV | — | 19.6 | — |
| N-propanol | — | — | 1.0 |
| Polysiloxane V having unsaturated groups | | | |
| V | 31.7 | 1.3 | 30.7 |
| Methylvinyl cyclics | — | 0.1 | — |
| Foam stabiliser | — | — | 2.0 |
| Catalyst | 0.5 | — | 0.5 |
| Filler 1 | 16.0 | 11.0 | 15.2 |
| Pigment (a) | 5.4 | — | 5.2 |
| Filler 2 | 5.0 | | 5.0 |

TABLE IV

| | Composition formed by mixing Parts | |
|---|---|---|
| Property | A5 + B3 (E) | A6 + B3 (F) |
| Molar Ratio | | |
| 1 | 5.5:1 | 4.9:1 |
| 2 | 6.1:1 | 5.3:1 |
| 3 | 1:74.5 | 1:76.8 |
| 4 | 1:12.3 | 1:14.5 |
| Curing time (seconds) | 350 | 290 |
| Quantity (ml) | | |
| Free Foam | 195 | 240 |
| Density (Kg/m³) | | |
| Free Foam | 150 | 240 |
| Elastomer properties (Young's modulus of Compression) | | |
| Free Foam | | |
| Before post cure | 0.084 | 0.078 |
| After post cure | 0.342 | 0.355 |
| Fire Resistance | | |
| Free Foam | | |
| Before Post-Cure | 830 | 720 |
| After Post-Cure | 720 | 670 |

The formulation E (A5+B3) results in a more friable foam upon post-cure whilst the higher density foam F(A6+B3) containing the prefoamer shows better flexibility due to its more regular cell structure.

That which is claimed is:

1. A method of making a cured silicone foam the steps of introducing to a moulding cavity a quantity of a silicone polymer which is curable at room or slightly elevated temperature to provide a foam and bringing about curing of the polymer in the moulding cavity to form the cured silicone foam in which the moulding cavity is closed during foaming of the polymer whereby to restrict expansion of the foam and wherein the volume of the closed moulding cavity is at least 10% less than the volume which would be occupied by the foam produced by permitting that quantity of the polymer to foam and cure at room temperature without restriction.

2. A method according to claim 1 wherein the moulding cavity is provided by a mould comprising a base and side walls and a moveable top which provides closure means for closing the cavity.

3. A method according to claim 1 wherein the moulding cavity is defined by two preformed elements spaced apart to provide the moulding cavity which is closed at its periphery by spacer elements.

4. A method according to claim 1 wherein at least one surface of the moulding cavity is provided by a surface of an element of building board, stone, metal or glass, to which the cured foam is intended to adhere with or without the use of a surface primer.

5. A method according to claim 4 wherein the moulding cavity is designed for the production of building components, separation wall panels, exterior cladding elements, ceiling panels, silicone foam blocks or automotive body panels.

6. A method according to claim 1 wherein the polymer is foamed and cured in the moulding cavity at a temperature of the order of 18° to 35° C.

7. A method according to claim 6 wherein after completion of the foaming process the moulding is heated to effect a post cure.

8. A method according to claim 7 wherein the post cure is effected by microwave heating.

9. A method according to claim 1 wherein the silicone polymer comprises a polysiloxane having alkylhydrogensiloxane units according to the general formula $$R_p HSiO_{\frac{(3-p)}{2}}$$

with or without the presence of $R_2SiO$ units in which each R represents a methyl group, and p is 1 or 2, and having a viscosity of about 5 to about 50 $mm^2/s$, an organosilicon polymer including silicon bonded hydroxyl groups and one or more polysiloxanes having not less than two silicon-bonded aliphatically unsaturated groups per molecule and having a viscosity in the range 10 to 25000 $mm^2/s$.

10. A method according to claim 9 wherein the silicone polymer also comprises an alcohol.

11. A method according to claim 10 wherein the alcohol is n-propanol.

12. A method according to claim 9 wherein the polymer also contains a fluorosilicon surfactant.

13. A method according to claim 9 wherein the proportions of the ingredients of the silicone polymer is such that the ratio of silicon-bonded hydrogen atoms of the polysiloxane (A) to all silicon-bonded hydroxyl groups and carbon-bonded hydroxyl groups together with other reactive hydroxyl, unsaturated and other groups present in the composition is in the range 2.0:1 to 35.0:1, preferably 2.5:1 to 10.0:1.

14. A method according to claim 9 wherein the proportions of the ingredients of the silicon polymer is such that the ratio of silicon-bonded hydrogen atoms to carbon-bonded hydroxyl groups and silicon-bonded hydroxyl groups is in the range 2.1:1 to 40.0:1, preferably 2.5:1 to 10.0:1.

15. A method according to claim 9 wherein the proportions of the ingredients of the silicone polymer is such that the ratio of aliphatically unsaturated groups to silicon-bonded hydrogen atoms is in the range 1:6.9 to 1:800, preferably 1:20 to 1:150.

16. A polymer according to claim 9 wherein the proportions of the ingredients of the silicone composition is such that the ratio of aliphatically unsaturated groups to carbon-bonded hydroxyl groups and silicon bonded hydroxyl groups is in the range 1:30 to 1:350, preferably 1:2 to 1:60.

* * * * *